(12) United States Patent
Scott et al.

(10) Patent No.: US 7,435,034 B2
(45) Date of Patent: Oct. 14, 2008

(54) FASCINES

(75) Inventors: Tommy Scott, Belfast (GB); Peter Gordon, Liverpool (GB)

(73) Assignee: Survitec Group Limited, Liverpool (GB)

( * ) Notice: Subject to any disclaimer, the term of this patent is extended or adjusted under 35 U.S.C. 154(b) by 234 days.

(21) Appl. No.: 10/556,570

(22) PCT Filed: Mar. 1, 2004

(86) PCT No.: PCT/IB2004/050176

§ 371 (c)(1),
(2), (4) Date: Sep. 26, 2006

(87) PCT Pub. No.: WO2004/099505

PCT Pub. Date: Nov. 18, 2004

(65) Prior Publication Data

US 2007/0092345 A1    Apr. 26, 2007

(30) Foreign Application Priority Data

May 12, 2003   (GB) .................................. 0310906.3

(51) Int. Cl.
*E01C 9/00*     (2006.01)

(52) U.S. Cl. .............................. 404/35; 404/36; 404/73; 404/75; 405/15; 405/19; 14/1

(58) Field of Classification Search ................... 404/35, 404/36, 71, 75; 14/1; 405/15, 19
See application file for complete search history.

(56) References Cited

U.S. PATENT DOCUMENTS

| 4,185,373 | A |   | 1/1980 | Holland et al. |
| 4,312,601 | A |   | 1/1982 | Allen |
| 4,566,821 | A |   | 1/1986 | Knight et al. |
| 5,122,400 | A | * | 6/1992 | Stewart ..................... 428/34.7 |
| 5,215,401 | A |   | 6/1993 | Knight |
| 5,406,662 | A |   | 4/1995 | Connor |

FOREIGN PATENT DOCUMENTS

FR           721 430        3/1932

* cited by examiner

*Primary Examiner*—Raymond W Addie
(74) *Attorney, Agent, or Firm*—Stites & Harbison PLLC; Douglas E. Jackson

(57) ABSTRACT

A fascine comprises a plurality of elongate hollow inflatable pipes (10). The pipes (10) can be surmounted by a trackway (11) formed by track sections (28) that are also inflatable. The pipes (10) in the track sections (28) can be vacuum packed for compact transportation and easy deployment.

26 Claims, 6 Drawing Sheets

DETAIL 'X'

FASCINES

FIELD OF THE INVENTION

The invention relates to fascines.

DESCRIPTION OF THE PRIOR ART

Fascines have been used for many centuries to smooth discontinuities in the ground such as ditches, riverbeds or walls to allow passage over the discontinuities. Early fascines were formed by bundles of sticks or branches. More recent proposals are shown, for example, in U.S. Pat. No. 4,566,821 where the fascine comprises a core of cylindrical pipes loosely disposed within a surrounding flexible sleeve formed by similar pipes. All the pipes are capable of elastic cross-sectional deformation. The pipes are high density polyethylene pipes. An alternative is disclosed in U.S. Pat. No. 4,312,601 where again high density polyethylene pipes are used which are carried in a pleated condition and then untensioned for use. In U.S. Pat. No. 5,215,401, polyethylene pipes are again used but surround a plurality of inflatable core members each formed by a tube filled with air. In U.S. Pat. No. 5,406,662, polyethylene tubes and inflatable core members are again used.

It is a problem with fascines including polyethylene pipes that the pipes are bulky to carry, heavy and difficult to deploy. In addition, if the fascine is required to form a relatively wide passageway, relatively long pipes must be transported and this can have associated difficulties. The use of air filled tubes has been proposed. The use of such tubes reduces the bulk and weight since such tubes can be inflated in situ, but are likely to have two problems. The first is that, if the discontinuity contains water, the tubes will tend to float and, if the water is flowing, the solid cross section of the tubes will cause the water to provide a force on the fascine that tends to move the fascine downstream. In addition, the solid air filled tubes proposed in the documents referred to above all tend to have significant resilience and this can cause the fascine to compress and expand as heavy objects, such as vehicles, pass over the fascine. This results in a significant increase in pressure within the inflatable item which exerts additional forces on the item.

Non-Limiting Summary of Invention

According to a first aspect of the invention, there is provided a fascine comprising an assembly of parallel elongate members with each member having a generally circular cross section, at least one member being formed by a wall which is at least partially inflatable and which, when inflated defines a hollow pipe.

In this arrangements the provision of a hollow pipe allows a flow of water through the member and the resilience of the member is much less than a solid tube. The member can be compactly packed and readily deployed. The mass of gas required to inflate such a pipe is low as compared with a solid non-hollow air filled tube.

Accordingly to a second aspect of the invention, there is provided a fascine comprising an assembly of parallel elongate members with each member having a generally circular cross section and a trackway for support by the members to allow vehicles to cross the fascine, the trackway including at least one inflatable section.

An inflatable trackway section can be compactly carried and readily deployed. Such a trackway may be used with a fascine according to the first aspect of the invention.

According to a third aspect of the invention, there is provided a method of deploying a fascine according to the first aspect of the invention comprising placing said members in a space to be filled by said fascine and then inflating at least one member.

According to a fourth aspect of the invention, there is provided a pipe for a fascine comprising a sheet of drop thread fabric formed into an elongate closed tube and inflation system for inflating the tube.

BRIEF DESCRIPTION OF DRAWINGS

The following is a more detailed description of some embodiments of the invention, by way of example, reference being made to the accompanying drawing in which.

DETAILED DESCRIPTION OF EMBODIMENTS

Figure 1:
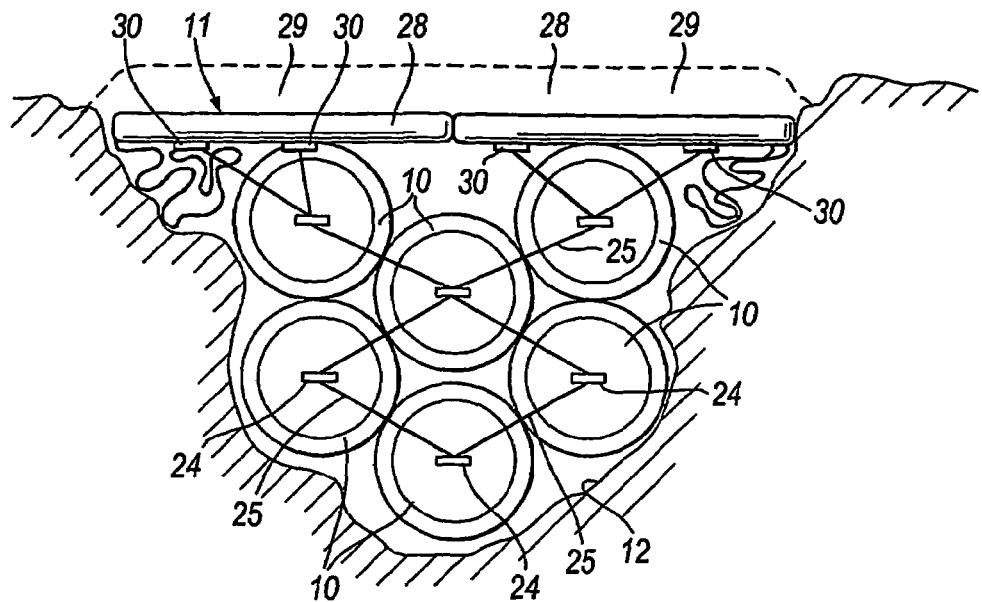
FIG. 1 is a schematic side elevation of a gully containing a first form of fascine formed by a plurality of inflatable hollow pipes and covered by a trackway formed from inflatable sections.
Figure 2:
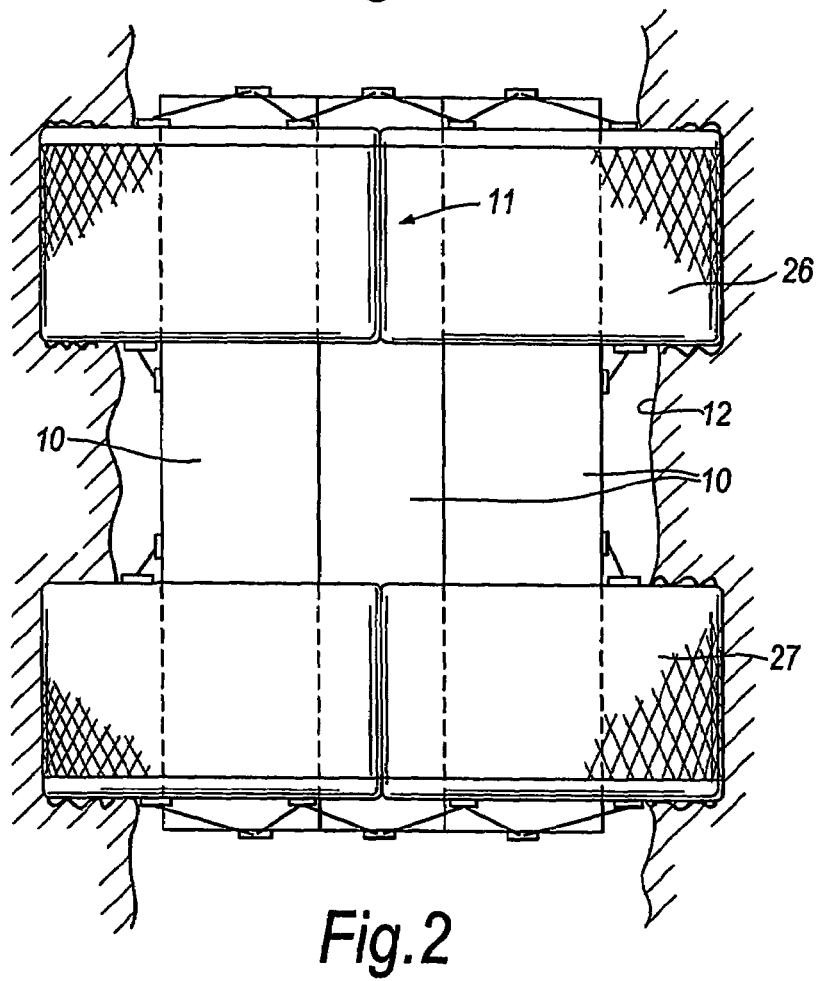
FIG. 2 is a plan view from above of the fascine of FIG. 1.

The fascine of FIGS. 1 to 6 comprises a plurality of pipes indicated generally at 10 carrying a trackway indicated generally at 11. As seen in FIGS. 1 and 2 the fascine is designed to smooth discontinuities such as the gully shown in FIGS. 1 and 2.

Figure 3:
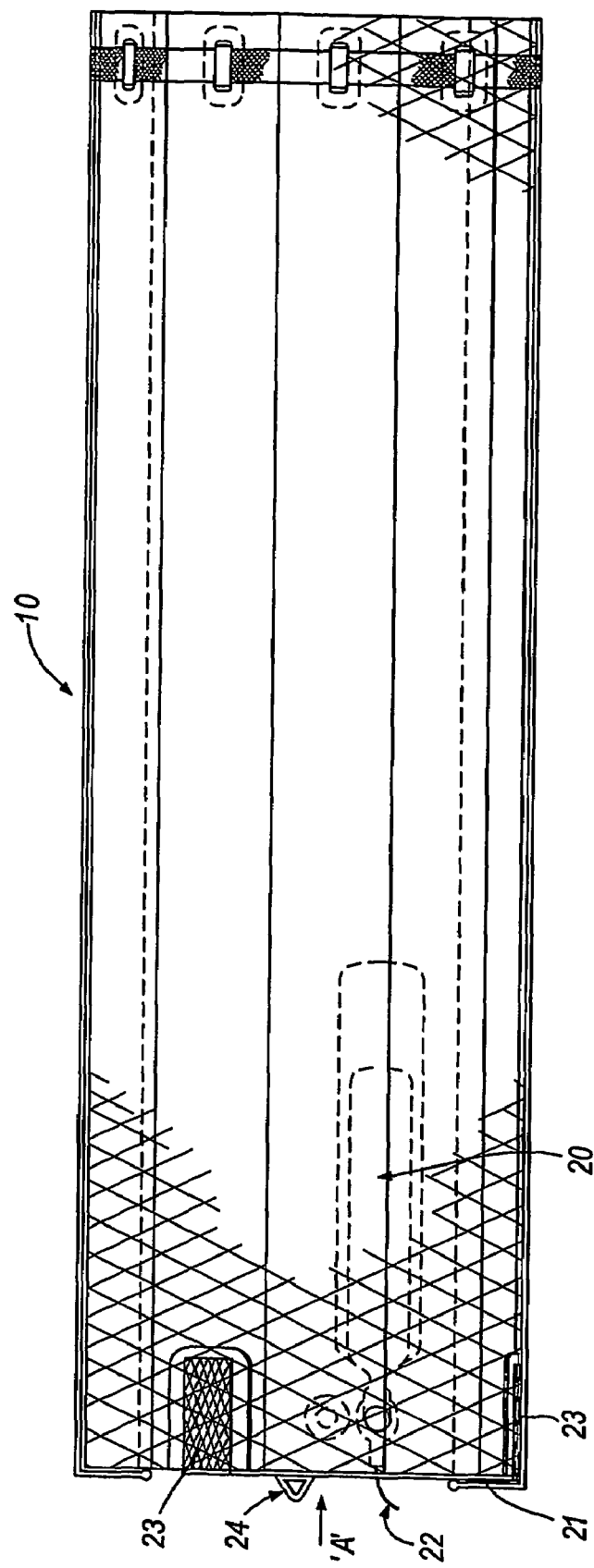
FIG. 3 is a side elevation of a hollow inflatable tube of the fascine of FIGS. 1 and 2 showing an inflation system and a harness.
Figure 4:
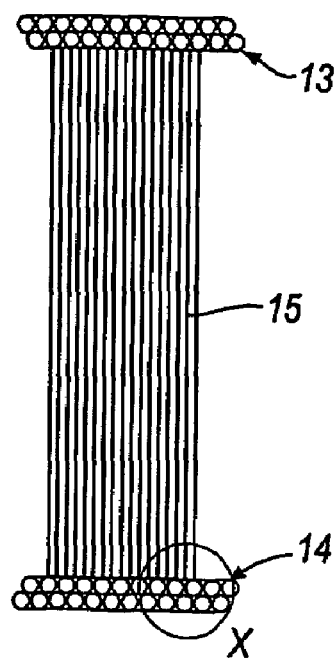
FIG. 4 is a schematic cross section of part of a drop thread composite fabric.
Figure 5:
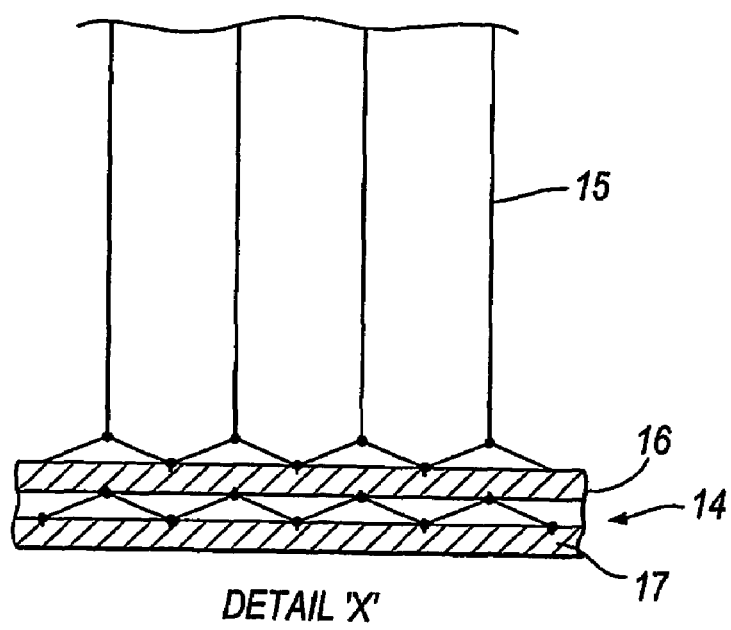
FIG. 5 is detail X of FIG. 4.

Referring next to FIGS. 3, 4, 5, and 6, each pipe 10 is elongate and is formed from a sheet of drop thread fabric of the kind shown in FIGS. 4 and 5. As seen in these Figures, the fabric comprises a first textile layer 13 interconnected to a second textile layer 14 by a plurality of drop threads shown schematically at 15. Both the first layer 13 and the second layer 14 are provided with an inner coating of polychloroperene a textile chafing layer 16 and an outer coating of polychloroperene 17. An elongate rectangular sheet of such drop thread material has the side edges of the first textile layer 13 connected together and the side edges of the second textile layer 14 connected together to form a hollow pipe with a first end and a second end. The first and second ends are also closed so that a closed chamber is formed between the first textile layer 13 and the second textile layer 14. The first textile layer 13 thus forms an outer wall of the pipe 10 and the second textile layer 14 an inner wall of the pipe 10.

Figure 6:
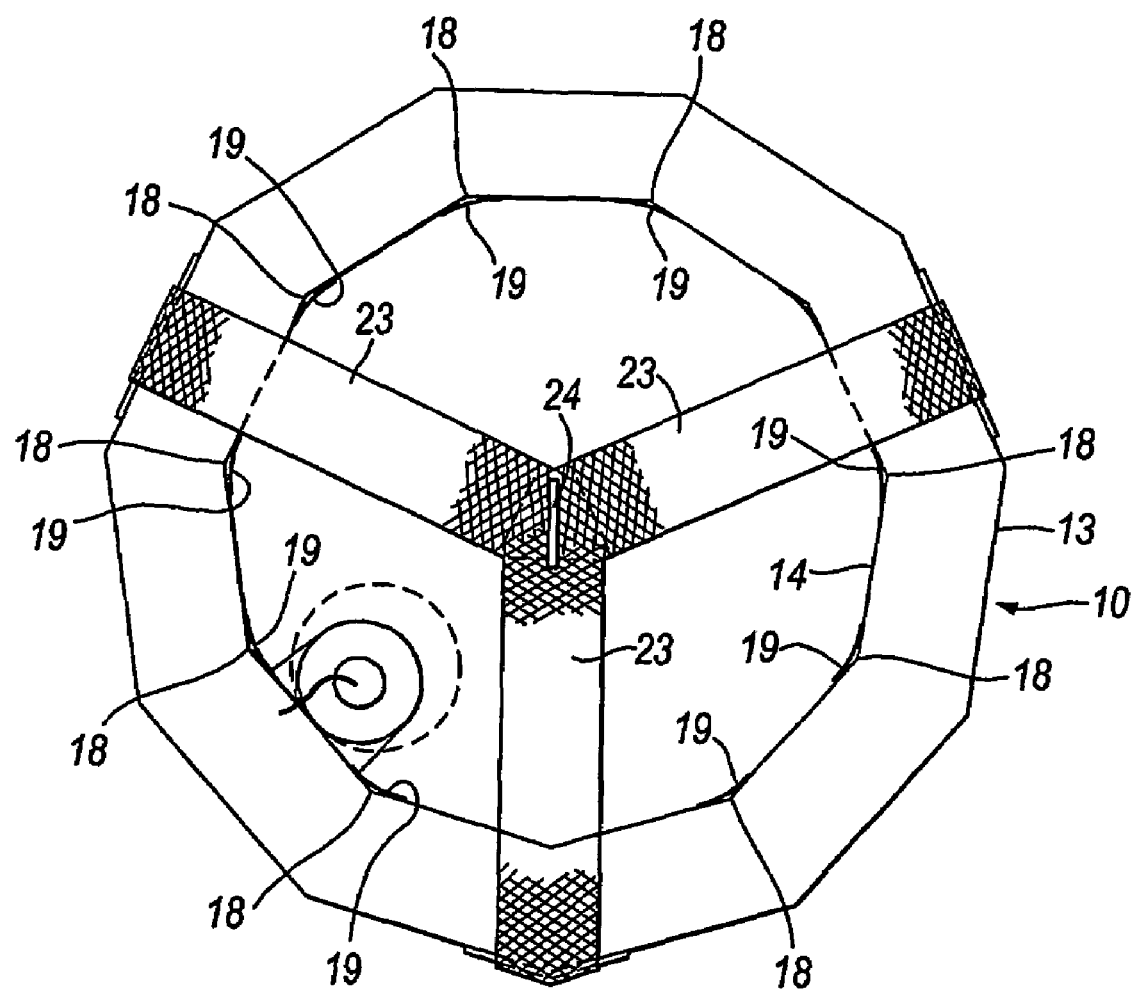
FIG. 6 is an end elevation of an inflatable tube of FIG. 3 showing in more detail the harness and the inflation system.

In order to control the creasing of the inner wall on inflation, the inner wall 14 is provided with a plurality of angularly spaced axially extending preformed crease lines 18. As seen in FIG. 6, these are equi-angularly spaced around the pipe 10. An elongate strip of material 19 is connected to the inner wall 14 along two angularly spaced axially extending lines, one on each side of the associated crease line 18. The spacing of these lines, along the material of the wall 14, is longer than the width of the strip 19 between these connections. Thus, when the pipe 10 is inflated, the pipe 10 is forced to fold between the connection lines to form the crease line 18.

Each pipe 10 carries an inflation system formed by an inflation cylinder 20 and a valve system 21. As seen in FIGS. 3 and 6, the inflation system is located within the associated pipe 10. The valve system 21 is provided with an initiator cable 22 that, when initiated, opens the valve and allows gas from the inflation cylinder 20 to inflate the wall of the pipe 10. In addition or alternatively, however, the valve system 21 may be operable from a position remote from the fascine. In particular, the valve system 21 may be operated by a remote signal e.g. radio.

Referring next to FIGS. 3 and 6, each end of each pipe 10 is provided with a harness in the form of lengths of webbing 23, with each length of webbing being attached at one end to the outer wall 13 of the associated pipe 10 and at the other end to the ends of the remaining lengths webbing 23 which meet at a point on the axis of the associated pipe 10. As seen in FIG. 6, the lengths of webbing 23 are equally angularly spaced around the associated pipe 10. At their, centre, the joined lengths of webbing 23 carry a D ring 24. As seen in FIG. 1, this D ring 24 is used to connect each pipe 10 to adjacent pipes 10 via elongate flexible members 25 such as strops. The members 25 are such as to allow limited relative movement between the pipes 10.

The trackway 11 is formed by two first and second spaced tracks 26, 27 as seen in FIG. 2. Each track 26, 27 is formed by two end to end generally rectangular track sections 28. Each track section 28 is formed from a sheet of drop fabric of the kind described above with a reference to FIGS. 4 and 5. The sheet is closed at its edges and provided with an inflation system similar to the inflation system for each pipe 10 described above with reference to FIGS. 3 and 6. In addition, each track section 28 has a side wall 29 extending along one edge of the track section 28 and has an under surface provided with attachment points 30. These attachment points 30 allow the track section to be connected to adjacent pipes 10 by flexible elongate members 25 of the kind described above and as seen in FIG. 1.

In use, the pipes 10 are deflated and may be vacuum packed separately from one another. The track sections 28 may be likewise vacuum packed separately and in deflated condition. In this way, the fascine can be readily transported as it is lightweight and compact. When a discontinuity is reached that is to be filled by the fascine, an estimate is made of the number of pipes 10 required to fill the discontinuity. As seen in FIGS. 1 and 2, in the instance illustrated in those Figures, six pipes 10 are required. The required number of pipes 10 are interconnected by the flexible members 25 using the D rings 24 and are placed in the discontinuity and the walls inflated. Inflation can either be via the initiation cable 22 or by remote signal. On inflation, the valve systems 21 open and gas from the inflation cylinder 20 passes into the pipes 10 to inflate the walls of the pipes 10. The flexible members 25 allow limited relative movement of the pipes 10 during such inflation so allowing them to deploy in such a way as to fill the discontinuity.

An estimate is also made of the number of track sections 28 required to form a trackway 11 of required length. Once the walls of the pipes 10 have inflated, the trackway sections 28 are placed on the inflated pipes 10 and are themselves inflated either, via an initiation cable 22 or remotely. When inflated, the trackway sections 28 form two side by side tracks 26 with the side walls 29 at the outer edges of the trackway 11. Flexible members 25 are used to connect the track sections 28 to adjacent pipes 10 by connections 30 and the D-rings 24.

The trackway sections are provided with an upper surface covered by a heavy duty layer of material such as kevlar as well as a chaffing layer.

Each pipe 10 is provided with a deflation system 31, as seen in FIGS. 3 and 6, to allow the walls of the pipes 10 to be deflated after use. The track sections 28 are provided with similar systems (not shown).

Figure 7:
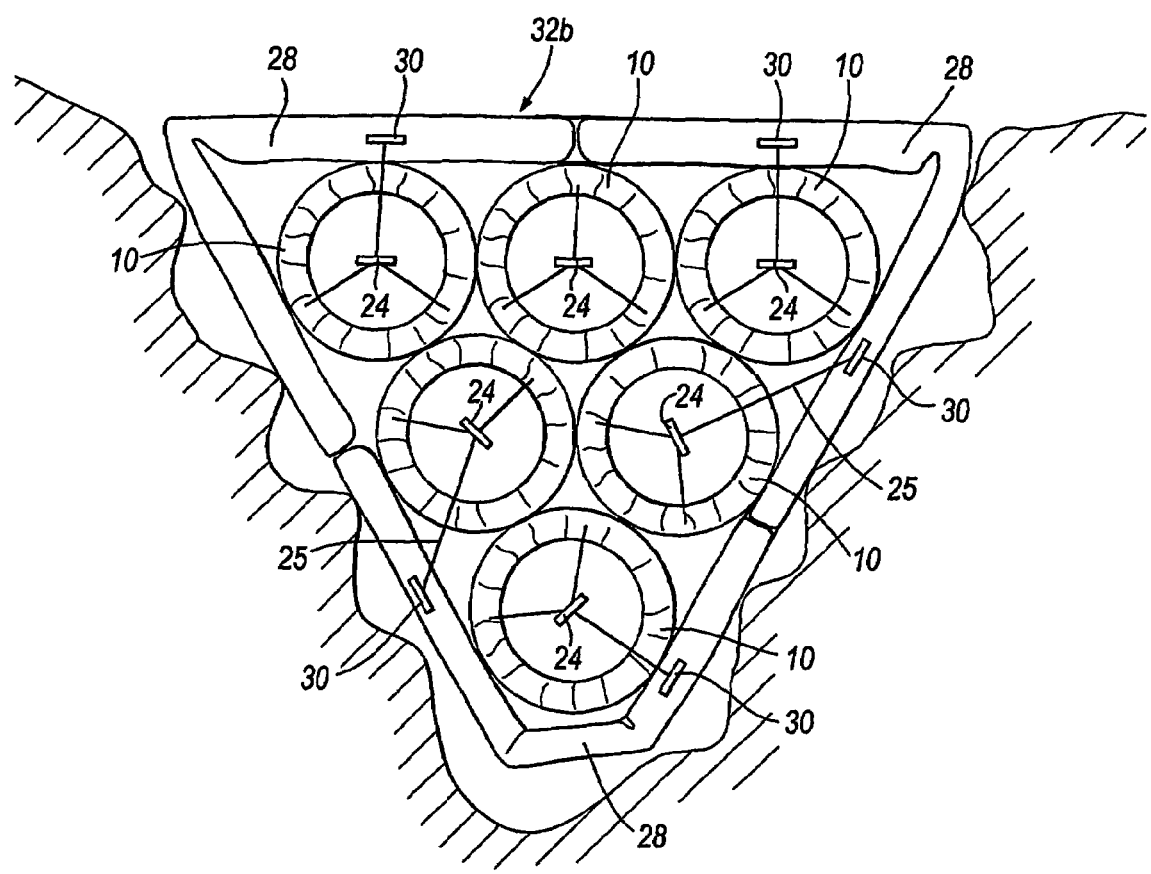
FIG. 7 is a similar view to FIG. 1 but showing a second form of fascine formed by a plurality of inflatable hollow pipes and surrounded by two spaced loops of trackway formed from inflatable sections.
Figure 8:
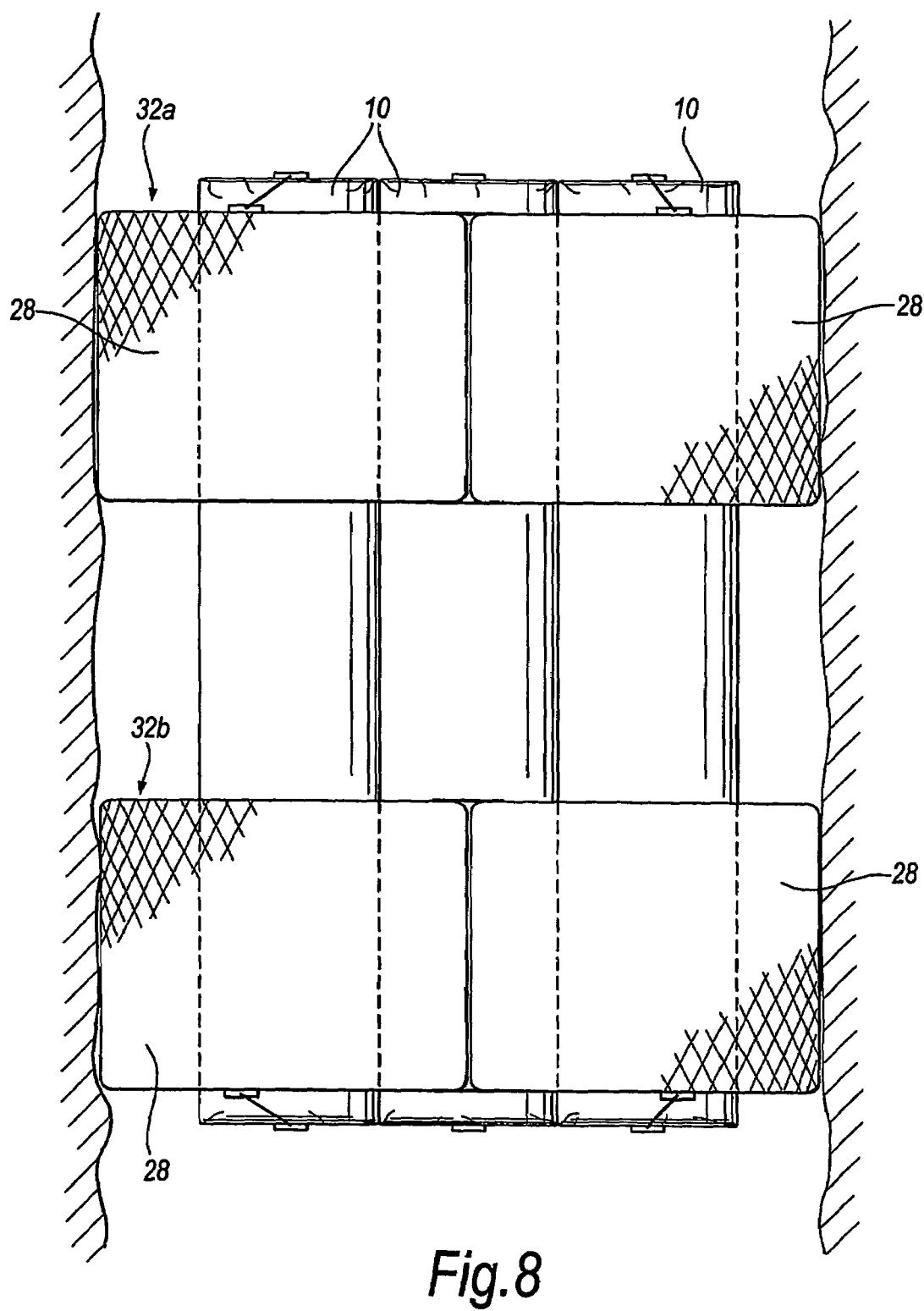
FIG. 8 is a plan view from above of the fascine from FIG. 6

Referring next to FIGS. 7 and 8, the second form of fascine has parts in common with the first form of fascine described above with reference to FIGS. 1 to 6. Those parts will be, given the same reference numerals in FIGS. 7 and 8 as they have in FIGS. 1 to 6 and will not be described in detail.

In the second form of fascine, the pipes 10 are the same as the pipes 10 described above with reference to FIGS. 1 to 6. The trackway 11 is, however, formed by two spaced loops 32a and 32b. Each loop 32a, 32b is formed by a number of track sections 28 of the kind described above with reference to FIGS. 1 to 6. As shown in FIG. 7, each loop is formed from three track sections 28—although there may be more or less track sections 28 as required. The track sections 28 of each loop 32a, 32b are connected end to end by a suitable connection 33 such as lacing or a zipper.

In use, as described above with reference to FIGS. 1 to 6, an estimate is made of the number of pipes required to fill a discontinuity that is to be filled by the fascine. The required number of pipes 10 are interconnected by the flexible members 25 using the D-rings 24. An estimate is also made of the number of track sections 28 required to form loops 32a, 32b of suitable length. The requisite number of track sections 28 are connected together using the connections 33 and the chosen number of pipes 10 are passed through the loops 32a, 32b so that each loop 32a, 32b is adjacent to a respective end of the pipes 10. The loops 32a, 32b thus hold the pipes 10 in a bundle. The ends of the pipes 10 are then connected to the associated loops 32a, 32b by flexible members 25 extending between the connections 30 and the D-rings 24.

The complete bundle of loops 32a, 32b and pipes 10 is then dropped into the discontinuity. This may be from the front of a vehicle. Once in the discontinuity, the track sections 28 and the walls of the pipes 10 are inflated as described above with reference to FIGS. 1 to 6. The loops 32a, 32b form into a shape with a minimum number of corners and therefore form a flat top surface which provides a two track roadway as seen in FIG. 8

The fascines described above with reference to the drawings have a number of advantages. The walls of the pipes 10 require low gas volume of inflation and therefore reduce pack bulk and weight. In certain arrangements, a pipe 10 of the kind described above with reference to the drawings requires a significantly reduced mass of (approx. 60% reduction) gas to inflate the fascine when compared to a closed cylinder of similar external dimensions.

The pipes 10 resolve various problems when used on water. In particular, they avoid the difficulty of excessive buoyancy in relation to a closed cylinder and also the problem of creating a 'dam' effect if used on flowing water.

Since the pipes 10 require low volumes of gas for inflation, the inflation cylinders 2 are light weight and may be disposable. Thus reusability of the pipes 10 is major benefit.

The location of the inflation system 20 within the associated pipe 10 provides protection for the system 20. The inflation system 20 is suitable for remote activation, is relatively quiet on inflation and it is suspected to have a low thermal image and radar signature.

It would be appreciated that there are a number of alterations that can be made to the fascine described above with reference to the drawings. The pipes 10 need not be used with the track sections 28; they could be used separately. Not all the pipes 10 need to be inflatable; some of the pipes could be pipes of rigid material. The pipes 10 need not be formed from a drop thread material; they could be simply be formed by inner and outer layers. One advantage of a drop thread fabric is, however, that it reduces hoop stresses. Each pipe 10 need not have a separate inflation system 20. A single inflation system 20 could inflate two or more pipes 10.

While the fascine as described above and referenced to the drawings has been shown filling a ravine or gully, it could be used to level any discontinuity. For example, it could be used to provide a ramp to allow a wall or other vertical obstruction to be surmounted.

The invention claimed is:

1. A fascine comprising an assembly of parallel elongate members with each member having a generally circular cross-section, at least one member being formed by a wall which is at least partially inflatable and which, when inflated, defines a hollow pipe.

2. A fascine according to claim 1 wherein said at least one member is formed by an outer and inner spaced walls which, when inflated, form respective concentric spaced pipes.

3. A fascine according to claim 2 wherein the inner wall and the outer wall are formed by respective walls of a drop thread fabric providing interconnecting threads between the inner wall and the outer wall.

4. A fascine according to claim 2 wherein the inner wall is provided with a plurality of angularly spaced axially extending pre-formed crease lines to control the folding of the inner wall on inflation.

5. A fascine according to claim 4 where each crease line is formed by an elongate strip of material connected to the inner wall along two angularly spaced axially extending lines whose spacing along the wall is longer than the width of the strip between the connections.

6. A fascine according to claims 1 wherein said at least one member includes a source of inflation gas and a valve operable to inflate the member.

7. A fascine according to claim 6 wherein the source of inflation gas is located within said pipe.

8. A fascine according to claim 6 wherein the valve is operable from a position remote from the member.

9. A method of deploying a fascine according to claim 1 comprising placing said members in a space to be filled by said fascine and then inflating said at least one member.

10. A fascine according to claim 1 wherein said at least one member is one of a plurality of such members.

11. A fascine according to claim 10 wherein each member of the plurality of members has a first end and a second end, the first ends of the plurality of members being interconnected and the second ends of the plurality being interconnected, the interconnection permitting limited movement between the members.

12. A fascine according to claim 11 wherein each interconnection is formed by a harness at the associated end of the member and a flexible elongate member extending between said harness and harness of an adjacent member.

13. A fascine comprising an assembly of parallel elongate members with each member having a generally circular cross-section and a trackway for support by the members, to allow vehicles/people to cross the fascine, the trackway including at least one inflatable section.

14. A fascine according to claim 13 wherein the inflatable trackway section comprises an upper wall and a lower wall of generally rectangular shape.

15. A fascine according to claim 14 wherein the upper wall and the lower wall are formed by respective walls of drop thread fabric providing interconnecting threads between the upper wall and the lower wall.

16. A fascine according to claim 14 where the upper wall is covered by a layer of wear resistant material.

17. A fascine according to claim 14 wherein said at least one inflatable section includes a source of inflation gas and a valve operable to inflate the section.

18. A fascine according to claim 17 wherein the valve is operable from a position remote from the section.

19. A fascine according to claim 13 wherein the trackway extends around the plurality of elongate members to hold the members in a bundle.

20. A fascine according to claim 19 wherein the trackway is formed by a plurality of inflatable sections connected end-to-end.

21. A fascine according to claim 13 wherein the trackway is formed by two side-by-side but spaced paths, each path being formed by one or more of said inflatable sections.

22. A fascine according to claim 20 wherein each path is formed by two or more of said inflatable sections placed end-to-end.

23. A fascine according to claim 21 wherein each section includes an elongate side edge, an inflatable wall being provided along said side edge.

24. A fascine according to claim 13 wherein at least one section is connected to at least one of said members by an elongate flexible member permitting limited relative movement between the section and the member.

25. A fascine according to claim 13, said at least one member being formed by a wall which is at least partially inflatable and which, when inflated, defines a hollow pipe.

26. A pipe for a fascine comprising a sheet of drop thread fabric formed into an elongate closed pipe and an inflation system for inflating the pipe.

* * * * *